(12) United States Patent
Sato et al.

(10) Patent No.: US 6,733,975 B2
(45) Date of Patent: May 11, 2004

(54) DNA CHIP AND ITS PREPARATION

(75) Inventors: Tadahisa Sato, Kanagawa (JP); Koki Nakamura, Kanagawa (JP); Hiroshi Shinoki, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/042,703

(22) Filed: Mar. 21, 2002

(65) Prior Publication Data

US 2003/0108878 A1 Jun. 12, 2003

Related U.S. Application Data

(63) Continuation of application No. 09/749,703, filed on Dec. 27, 2000, now abandoned.

(30) Foreign Application Priority Data

Dec. 27, 1999 (JP) .............................. 11-371333

(51) Int. Cl.$^7$ ........................... C12Q 1/68; G01N 33/53
(52) U.S. Cl. .............................. 435/6; 435/7.1; 435/7.2
(58) Field of Search ............................... 435/6, 7.1, 7.2

*Primary Examiner*—Jezia Riley
(74) *Attorney, Agent, or Firm*—Reed Smith LLP

(57) ABSTRACT

An analytical element (typically DNA chip) composed of a solid carrier and a group of nucleotide derivatives or their analogues fixed to the solid carrier can be produced by bringing nucleotide derivatives or the analogues having an alkyne group at one terminal into contact with a zero-valent metal film (e.g., silver metal film or copper metal film) placed on the solid carrier.

4 Claims, No Drawings

DNA CHIP AND ITS PREPARATION

This application is a continuation of Ser. No. 09/749,703 filed on Dec. 27, 2000 now abandoned.

FIELD OF THE INVENTION

This invention relates to a solid carrier to which nucleotide derivatives or their analogues (e.g., oligonucleotides, polynucleotides, and peptide-nucleotides) are attached, which is generally named DNA chip and which is favorably employable for detecting, with high sensitivity, complementary nucleic acid fragments.

BACKGROUND OF THE INVENTION

Detection of a nucleic acid fragment is generally performed using a probe oligonucleotide which is complementary to the nucleic acid fragment to be detected, by way of hybridization. The probe oligonucleotide is generally fixed onto a solid carrier (e.g., solid substrate) to produce a so-called DNA chip. In the detection procedures, a nucleic acid fragment in a sample liquid is provided with a fluorescent label or a radioisotope label, and then the sample liquid is brought into contact with the probe oligonucleotide of the DNA chip. If the labelled nucleic acid fragment in the sample liquid is complementary to the probe oligonucleotide, the labelled nucleic acid fragment is combined with the probe oligonucleotide by hybridization. The labelled nucleic acid fragment fixed to the DNA chip by hybridization with the probe oligonucleotide is then detected by an appropriate detection method such as fluorometry or autoradiography. The DNA chip is widely employed in the gene technology, for instance, for detecting a complementary nucleic acid fragment and sequencing the detected nucleic acid fragment.

The DNA chip can be utilized to efficiently detect a large number of complementary nucleic acid fragments in a small amount of a sample liquid within a short period of time.

Detection of nucleic acid fragment using an electrochemical label is also known (Japanese Patent Provisional Publication No. 9-288080, and a preprint of the 57th Analytical Chemistry Conference pp. 137–138 (1996)).

P. E. Nielsen et al., Science, 254, 1497–1500 (1991) and P. E. Nielsen et al., Biochemistry, 36, pp. 5072–5077 (1997) describe PNA (Peptide Nucleic Acid or Polyamide Nucleic Acid) which has no negative charge and functions in the same manner as DNA fragment does. PNA has a polyamide skeleton of N-(2-aminoethyl)glycine units and has neither glucose units nor phosphate groups.

Since PNA is electrically neutral and is not charged in the absence of an electrolytic salt, PNA is able to hybridize with a complementary nucleic acid fragment to form a hybrid which is more stable than the hybrid structure given by a probe oligonucleotide and its complementary nucleic acid fragment (Preprint of the 74th Spring Conference of Japan Chemical Society, pp. 1287, reported by Naomi Sugimoto).

Japanese Patent Provisional Publication No. 11-332595 describes a PNA probe fixed onto a solid carrier at its one end and a detection method utilizing the PNA probe. The PNA probe is fixed onto the solid carrier by the known combination of avidin and biotin.

The aforementioned P. E. Nielsen et al., Science, 254, 1497–1500 (1991) also describes a PNA probe labelled with an isotope element and a detection method of a complementary nucleic acid fragment.

Since the PNA probe shows no electric repulsion to a target nucleic acid fragment in a sample liquid, an improved high detection sensitivity is expected.

At present, two methods are known for preparing a DNA chip having a solid carrier and oligonucleotides or polynucleotides fixed onto the carrier. One preparation method comprises preparing oligonucleotides or polynucleotides, step by step on the carrier. This method is named "on-chip method". A typical on-chip method is described in Foder, S. P. A., Science, 251, page 767 (1991).

Another preparation method comprises fixing separately prepared oligonucleotides or polynucleotides onto a solid carrier. Various methods are known for various oligonucleotides and polynucleotides.

In the case of the complementary nucleotide derivatives (which are synthesized using mRNA as mold) or PCR products (which are DNA fragments prepared by multiplying cDNA by PCR method), an aqueous solution of the prepared DNA fragment is spotted onto a solid carrier having a poly-cationic coat in a DNA chip-preparing device to fix the DNA fragment to the carrier via electrostatic bonding, and then blocking a free surface of the polycationic coat.

In the case that the oligonucleotides are synthetically prepared and have a functional group, an aqueous solution of the synthetic oligonucleotides is spotted onto an activated or reactive solid carrier to produce covalent bonding between the oligonucleotides and the carrier surface. See Lamture, J. B., et al., Nucl. Acids Res., 22, 2121–2125, 1994, and Guo, Z., et al., Nucl. Acids Res., 22, 5456–5465, 1994. Generally, the oligonucleotides are covalently bonded to the surface activated carrier via linking groups.

Also known is a process comprising the steps of aligning small polyacrylamide gels on a glass plate and fixing synthetic oligonucleotides onto the glass plate by making a covalent bond between the polyacrylamide and the oligonucleotide (Yershov, G., et al., Proc. Natl. Acad. Sci. USA, 94, 4913 (1996)). Sosnowski, R. G., et al., Proc. Natl. Acad. Sci. USA, 94, 1119–1123 (1997) discloses a process comprising the steps of placing an array of microelectrodes on a silica chip, forming on the microelectrode a streptoavidin-comprising agarose layer, and attaching biotin-modified DNA fragments to the agarose layer by positively charging the agarose layer. Schena, M., et al., Proc. Natl. Acad. Sci. USA, 93, 10614–10619 (1996) teaches a process comprising the steps of preparing a suspension of an amino group-modified PCR product in SSC (i.e., standard sodium chloride-citric acid buffer solution), spotting the suspension onto a slide glass, incubating the spotted glass slide, treating the incubated slide glass with sodium borohydride, and heating thus treated slide glass.

As is explained above, most of the known methods of fixing separately prepared DNA fragments onto a solid carrier utilize the electrostatic bonding or the covalent bonding such as described above.

In any DNA chips having separately prepared oligonucleotide probes on its solid carrier, the oligonucleotide probes should be firmly fixed onto the carrier, so that the hybridization can proceed smoothly between the fixed oligonucleotide probes and target DNA fragments complementary to the fixed oligonucleotide probes.

Further, it is preferred that a surface area of the solid carrier other than the portion to which the probe oligonucleotides are fixed is inactive to the labelled DNA fragments, so that non-complementary DNA fragments in the liquid sample can be kept from attaching onto the surface in the course of the detection procedure utilizing hybridization and kept from remaining on the surface of the carrier. If the non-complementary DNA fragments remain in the surface of the carrier, the accuracy of the detection decreases.

U.S. Pat. No. 5,387,505 describes a method of separating a target DNA fragment by binding target DNA fragments labelled with a biotin molecule with a substrate having avidin molecules.

U.S. Pat. No. 5,094,962 discloses a detection tool for a ligand-receptor assay in which receptor molecules are bonded to a porous polymer particle having a reactive group.

SUMMARY OF THE INVENTION

It is an object of the present invention to provide a solid carrier to which a group of nucleotide derivatives or their analogues (e.g., oligonucleotides, polynucleotides, and peptide-nucleotides, which serve as probes for detecting complementary DNA fragments by way of hybridization) are attached and which is favorably employable for detecting, with high sensitivity, complementary nucleic acid fragments.

It is another object of the invention to provide a DNA chip which is employable in the procedure for detecting complementary DNA fragments without performing in advance a blocking procedure, that is, a procedure of inactivating the solid carrier in the areas having no probes, so as to keep non-complementary DNA fragments from fixing on the carrier by non-hybridization mechanism.

The present invention resides in an element comprising a solid carrier and a group of nucleotide derivatives or their analogues which are fixed to the solid carrier, in which the element is covered with a zero-valent metal film and the nucleotide derivative or the analogue is fixed onto the solid carrier via an alkylene chain which is directly attached to the metal film.

The invention further resides in an element comprising a solid carrier and a group of nucleotide derivatives or their analogues which are fixed to the solid carrier, wherein the element is covered with a zero-valent metal film and the nucleotide derivative or the analogue is fixed onto the metal film by reaction between an alkyne group attached to one terminal of the nucleotide derivative or the analogue and the metal film.

The element of the invention is favorably prepared by bringing a group of nucleotide derivatives or their analogues having an alkyne group at one terminal thereof into contact with a zero-valent metal film placed on a solid carrier in a liquid phase, to fix the nucleotide derivatives or the analogues onto the metal film via the terminal.

The detection method of the invention for oligonucleotides or polynucleotides such as DNA fragments can be performed by bringing the solid carrier having probes (i.e., a group of nucleotide derivatives or their analogues) fixed onto its surface into contact with oligonucleotides or polynucleotides (such as target DNA fragments) which are complementary to the probes of nucleotide derivatives or their analogues fixed onto the surface of the solid carrier in the presence of an aqueous solvent, so as to combine the complementary oligonucleotides or polynucleotides with the nucleotide derivatives or their analogues.

DETAILED DESCRIPTION OF THE INVENTION

[Solid Carrier]

The solid carrier utilized in the invention is coated on its surface with a thin metal film of a zero-valent metal element such a silver metal film or a copper metal film. The solid carrier can be any of known solid carriers or their equivalent materials, for instance, a glass plate, a resin plate, a metal plate, and a glass plate covered with polymer coat. Also employable is a SPR (surface plasmon resonance) sensor plate which is described in Japanese Patent Provisional Publication No. 11-332595. CCD is also employable as described in Nucleic Acids Research, 1994, Vol. 22, No. 11, 2124–2125.

The solid carrier may have on its surface a pre-coat of a resin so as to form a smooth surface on the carrier surface.

The zero-valent metal film on the solid carrier of the invention generally has a thickness in the range of 0.2 nm to 1,000 nm, preferably 0.3 nm to 500 nm, more preferably 0.5 nm to 400 nm, and can be formed on the solid carrier by a known deposition method. The metal film can also be formed on the solid carrier by coating a dispersion of fine particles of zero-valent metal (preferably has a mean particle size of 10 nm to 500 nm) in a polymer binder solution and drying the coated dispersion. The binder polymer may be polyvinyl alcohol or gelatin.

[Probes—Nucleotide Derivative]

The probe compounds, namely, nucleotide derivatives or their analogues to be fixed to the solid carrier can be oligonucleotides, polynucleotides, or peptide-nucleotides. A DNA fragment can be employed as the probe compound.

The nucleotide derivative may be polynucleotide such as cDNA, a portion of cDNA, or EST. The polynucleotide is favorably employed for studying gene expression. Otherwise, nucleotide derivatives to be fixed onto the solid carrier may be oligonucleotides, which are favorably employed for studying variations and polymorphism of gene. The oligonucleotide to be fixed onto the solid carrier preferably is one of 3 to 50-mers, more preferably 10 to 25 mers. The oligonucleotide and polynucleotide can have one or more substituent groups and/or cross-linking groups, provided that the attachment of these groups does not impart adverse influence to the function of the oligonucleotide and polynucleotide. For instance, LNA (locked nucleic acid) which is described in J. Am. Chem. Soc., 1998, 120, 13252–13253, can be employed.

The probe compounds (i.e., nucleotide derivatives or their analogues) are fixed on the metal film of the solid carrier utilizing an alkyne group attached to the probe compounds at their terminals, namely, at one end or its vicinity.

The alkyne group is preferably attached to the terminal of the nucleotide derivative or the analogue via a linking group. Examples of the alkyne groups include those derived from acetylene, methylacetylene, 1-butyne, 1-pentyne, 1-hexyne, 1-heptyne, 1-octyne, 1-nonyne, or 1-decine.

The probe compound having an alkyne group at its terminal can be prepared by one of the following two methods.

(1) A primer which is a probe compound having an appropriate alkyne group is multiplied by the PCR method.

(2) A primer which is a probe compound having a reactive group such as amino is multiplied by the PCR method, and to the resulting probe compounds having a reactive group is attached an appropriate alkyne group.

Generally, the latter method can be readily performed, and accordingly is preferred in the present invention. The attachment of an amino group to the probe compound can be attained by forming an amide bonding between the amino group and a carboxyl group of an appropriate compound using a condensing agent.

The probe compound having at its terminal an amino group can be produced by a known method and is also available commercially. In more detail, the amino group of the probe compound can be combined with a coupling component having carboxyl, formyl, halosulfonyl, isocyanato or isothiocyanato or a coupling component having as its partial structure an acid anhydride or a ketene using heat treatment or using an appropriate base and a condensing agent. In this procedure, a coupling component having carboxyl, isocyanato, or isothiocyanato is preferred. Most preferred is a coupling component having carboxyl, which can form an amido bonding with amino using an appropriate condensing agent (e.g., carbodiimide compound).

The reaction employed in the methods of fixing the probe compound onto the metal film of the solid carrier can be conducted in the presence of an acid or a base. The acid can be an inorganic acid or an organic acid, such as hydrochloric acid, sulfuric acid, phosphoric acid, p-toluenesulfonic acid, trifluoroacetic acid, acetic acid, or trifluoromethanesulfonic acid.

The base can be an organic base or an inorganic base which may be employed singly or in combination. Examples of the preferred bases include 1-methyl-2-pyrrolidone, triethylamine, pyridine, potassium carbonate, and sodium carbonate. Preferred are organic bases such as 1-methyl-2-pyrrolidone, triethylamine and pyridine. Most preferred is 1-methyl-2-pyrrolidone.

The reactions can be performed in an aqueous solvent or an organic solvent. The organic solvent may be a hydrophobic solvent such as toluene, xylene or n-hexane. However, a polar solvent which is miscible with water can be preferably employed. Examples of the preferred polar solvents include ethyl acetate, methyl acetate, methanol, ethanol, isopropyl alcohol, n-butanol, t-butanol, sulforane, 1,2-diemethoxyethane, dimethylformamide, dimethylsulfoxide, dimethylacetamide, acetonitrile, propionitrile, diethyl ether, tetrahydrofuan, ethylene glycol, 1,3-propanediol, 1,4-butanediol, glycerol, 2-methoxyethanol, diethylene glycol, diethylene glycol dimethyl ether, acetic acid, pyridine, formic acid, propionic acid, and valeric acid.

[Procedure of Fixation]

The nucleotide derivatives (or their analogues) which have the alkyne group at one terminals and to be fixed on the solid carrier are dissolved or dispersed in an aqueous solution. Generally, the aqueous solution is once placed on a plastic plate having 96 or 384 wells, and then spotted onto a solid carrier using a spotting means.

The reaction for fixing the probe compounds having at their terminal (or in the vicinity) an alkyne group to the solid carrier having on its surface can be performed at ambient temperatures or heating. The heating condition is favorably adopted. Preferably, the reaction is performed at 40 to 150° C., more preferably at 50 to 120° C. The reaction can be conducted in a pressure-resistant vessel such as an autoclave.

In order to keep the spotted aqueous solution from evaporating, it is preferred to add a high boiling-point compound to the aqueous solution containing nucleotide derivatives. The high boiling-point compound should be soluble in an aqueous medium, should not disturb hybridization procedure, and preferably has an appropriate viscosity. Examples of the high boiling-point compounds include glycerol, ethylene glycol, dimethylsulfoxide, and a hydrophilic polymer having a low molecular weight (typically, in the range of $10^3$ to $10^6$) such as polyacrylamide, polyethylene glycol, or poly(sodium acrylate). The high boiling-point compound preferably is glycerol or ethylene glycol. The high boiling-point compound is preferably incorporated into an aqueous nucleotide derivative solution in an amount of 0.1 to 2 vol. %, particularly 0.5 to 1 vol. %. Otherwise, the spotted aqueous solution is preferably kept at under the conditions of a high humidity (such as 90% RH or higher) and an ordinary temperature (25 to 50° C.).

The aqueous solution is spotted onto the solid carrier under the condition that each drop of the solution generally has a volume of 100 pL to 1 $\mu$L, preferably 1 to 100 nL. The nucleotide derivatives preferably spotted onto the solid carrier are in an amount (number) of $10^2$ to $10^5$/cm$^2$. In terms of mol., 1 to 10–15 moles are spotted. In terms of weight, several ng or less of nucleotide derivatives are spotted. The spotting of the aqueous solution is made onto the solid carrier to form several dots having almost the same shape and size. It is important to prepare these dots to have the same shape and size, if the hybridization is quantitatively analyzed. Several dots are formed separately from each other with a distance of 1.5 mm or less, preferably 100 to 300 $\mu$m. One dot preferably has a diameter of 50 to 300 $\mu$m.

After the aqueous solution is spotted on the solid carrier, the spotted solution is preferably incubated, namely, kept for a certain period at room temperature or under warming, so as to fix the spotted nucleotide derivatives onto the carrier. In the course of incubation, UV irradiation or surface treatment using sodium borohydride or a Shiff reagent may be applied. The UV irradiation under heating is preferably adopted. It is assumed that these treatments are effective to produce additional linkage or bonding between the solid carrier and the attached oligonucleotide derivatives. The free (namely, unfixed) nucleotide derivatives are washed out using an aqueous solution. Thus washed solid carrier is then dried to give a nucleotide derivative-fixed solid carrier (such as DNA chip) of the invention.

It is not necessary to subject thus prepared analytical element to blocking treatment. However, the analytical element may be subjected to blocking treatment, if desired.

The nucleotide derivative-fixed solid carrier of the invention is favorably employable for monitoring of gene expression, sequencing of base arrangement of DNA, analysis of mutation, analysis of polymorphism, by way of hybridization.

[Sample Nucleic Acid Fragment—Target]

A target DNA fragment or a sample DNA fragment, which is subjected to the analysis concerning the presence of a complementary DNA fragment can be obtained from various origins. In the analysis of gene, the target DNA fragment is prepared from a cell or tissue of eucaryote. In the analysis of genome, the target DNA fragment is obtained from tissues other than erythrocyte. In the analysis of mRNA, the target sample is obtained from tissues in which mRNA is expressed. If the DNA chip has an oligonucleotide fixed in its solid carrier, the target DNA fragment preferably has a low molecular weight. The target DNA may be multiplied by PCR method.

To the target DNA fragment is attached an RI label or a non-RI label by a known method. The non-RI label is preferably utilized. Examples of the non-RI labels include fluorescence label, biotin label, and chemical luminescence label. The fluorescence label is most preferably employed. Examples of the fluorescence labels include cyanine dyes (e.g., Cy3 and Cy5 belonging to Cy Dye™ series), rhodamine 6G reagent, N-acetoxy-N$^2$-acetyl-aminofluorene (AAF), and AAIF (iodide derivative of AAF). The target or sample DNA fragments labelled with different fluorescence indicators can be simultaneously analyzed, if the fluorescence indicators have fluorescence spectrum of different peaks. Also employable is an electroconductive label.

[Hybridization]

The hybridization is performed by spotting an aqueous sample solution containing a target DNA fragment onto a DNA chip. The spotting is generally done in an amount of 1 to 100 nL. The hybridization is carried out by keeping the DNA chip having the spotted sample solution thereon at a temperature between room temperature and 70° C., for 6 to 20 hours. After the hybridization is complete, the DNA chip is washed with an aqueous buffer solution containing a surface active agent, to remove a free (namely, unfixed) sample DNA fragment. The surface active agent preferably is sodium dodecyl sulfate (SDS). The buffer solution may be a citrate buffer solution, a phosphate buffer solution, a borate buffer solution, Tris buffer solution, or Goods buffer solution. The citrate buffer solution is preferably employed.

The present invention is further described by the following examples.

EXAMPLE 1

Manufacture of Oligonucleotide-Fixed Plates (1) Preparation of Glass Plate Having on its Surface a Zero-Valent Metal Coat A slide glass (25 mm×75 mm) was coated with a silver metal (0 valent) by deposition procedure, to give the metal coated plate (C).

(2) Fixation of Oligonucleotide and Measurement of Fluorescence Strength

An oligonucleotide (3'-CTAGTCTGTGAAGTGTCTGATC-5', 22-mers) having an amino group at 3'-terminal and a fluorescent label (FluoroLink, Cy 5-dCTP, available from Amasham Pharmacia Biotec Corp.) at 5'-terminal was treated with 5-hexynoic acid (available from Tokyo Kasei Industries Co., Ltd.) and 1-ethyl-3-(3-dimethylaminopropyl)carbodiimide hydrochloride (available from Tokyo Kasei Industries Co., Ltd.) to incorporate a 5-heptynoylamino group into the 3'-terminal of the oligonucleotide.

The oligonucleotide having a 5-heptynoylamino group at its 3'-terminal was dispersed in 1 μL of an aqueous solution containing a carbonate buffer solution (0.1 M, pH 9.8) at a concentration of $1 \times 10^{-6}$ M. The buffer solution was then spotted onto the glass plate (C) obtained in (1) above, and this was immediately kept at 60° C., 90% RH for one hour. Thus treated glass plate was then washed successively twice with a mixture of aqueous 0.1 wt. % SDS (sodium dodecyl sulfate) solution and aqueous 2× SSC solution (obtained by twice diluting standard sodium chloride-citrate buffer solution (SSC)), and once with the aqueous 0.2× SSC solution. Thus washed glass plate was placed in an aqueous 0.1 M propargyl alcohol solution (pH 10) for one hour, washed with distilled water, and then dried at room temperature, to obtain a glass plate (D1) on which the oligonucleotides were fixed.

The fluorescence strength of thus treated plate (D1) was measured using a fluorescence scanning apparatus. The fluorescence strength was 1,552, which was well higher than the background fluorescence strength. This means that the oligonucleotides are well fixed onto the glass plate.

EXAMPLE 2

Detection of Target Oligonucleotide (1) Preparation of DNA chip

A DNA chip, namely, glass plate (D2) on which the oligonucleotides were fixed was prepared in the same manner as in Example 1-(1) except for using the oligonucleotide having no fluorescent label.

(2) Detection of Target Oligonucleotide

A target oligonucleotide (GATCAGACACTCACAGACTAG-5', 22-mers) having Cy5 (fluorescent label) at its 5'-terminal was dispersed in 20 μL of a hybridizing solution (mixture of 4× SSC and 10 wt. % SDS). The resulting solution was spotted onto the glass plate (D2) prepared in (1) above, and its spotted surface was covered with a covering glass. Thus covered chip was subjected to incubation at 60° C. for 20 hours in a moisture chamber. The incubated chip was washed successively with a mixture of 0.1 wt. % SDS and 2× SSC, a mixture of 0.1 wt. %. SDS and 0.2× SSC, and an aqueous 0.2× SSC solution, centrifuged at 600 r.p.m. for 20 seconds, and dried at room temperature.

The fluorescence strength of thus treated glass plate was measured using a fluorescence scanning apparatus. The fluorescence strength was 598, which was well higher than the background fluorescence strength. This means that the target oligonucleotides are well fixed to the DNA chip having the complementary oligonucleotide probe.

What is claimed is:

1. An element comprising a solid carrier and a group of oligonucleotides, polynucleotides, or peptide-nucleotides which are fixed to the solid carrier, in which the solid carrier is covered with a silver metal film or a copper metal film, the oligonucleotide, polynucleotide, or peptide-nucleotide has an alkyne chain, and the alkyne chain is directly attached to the silver metal film or a copper metal film on the solid carrier.

2. A method of producing the element of claim 1, which comprises the steps of:

preparing a group of oligonucleotides, polynucleotides, or peptide-nucleotides having an alkyne chain at terminals thereof and a sold carrier covered with a silver metal film or a copper metal film; and bringing the group of oligonucleotides, polynucleotides, or peptide-nucleotides having an alkyne chain into contact with the silver metal film or copper metal film of the solid carrier in a liquid phase.

3. The element of claim 1, wherein the alkyne group is attached to the terminal of the oligonucleotide, polynucleotide, or peptide-nucleotide via a linking group.

4. The element of claim 1, wherein the alkyne group is derived from one selected from the group consisting of acetylene, methylacetylene, 1-butyne, 1-pentyne, 1-hexyne, 1-heptyne, 1-octyne, 1-nonyne, and 1-decine.

* * * * *

SEQUENCE LISTING

<160> NUMBER OF SEQ ID NOS: 2

<210> SEQ ID NO 1
<211> LENGTH: 22
<212> TYPE: DNA
<213> ORGANISM: Artificial
<220> FEATURE:
<221> NAME/KEY: misc_feature
<223> OTHER INFORMATION: HYPOTHETICAL SEQUENCE

<400> SEQUENCE: 1
ctagtctgtg aagtgtctga tc                    22

<210> SEQ ID NO 2
<211> LENGTH: 22
<212> TYPE: DNA
<213> ORGANISM: Artificial
<220> FEATURE:
<221> NAME/KEY: misc_feature
<223> OTHER INFORMATION: HYPOTHETICAL SEQUENCE

```
<400> SEQUENCE: 2
gatcagacac ttcacagact ag                                              22
```